United States Patent
Delons et al.

(10) Patent No.: US 7,708,962 B2
(45) Date of Patent: May 4, 2010

(54) PROCESS FOR THE SEPARATION AND PURIFICATION OF HAFNIUM AND ZIRCONIUM

(75) Inventors: Laurence Delons, Saint Genis Laval (FR); Stéphane Lagarde, St Pierre de Mesage (FR); Alain Favre-Reguillon, Villeurbanne (FR); Stéphane Pellet-Rostaing, Villeurbanne (FR); Marc Lemaire, Villeurbanne (FR); Ludovic Poriel, Lyons (FR)

(73) Assignee: Compagnie Europeenne du Zirconium-Cezus, Courbevoie (FR)

( * ) Notice: Subject to any disclaimer, the term of this patent is extended or adjusted under 35 U.S.C. 154(b) by 304 days.

(21) Appl. No.: 11/632,021

(22) PCT Filed: Jul. 7, 2005

(86) PCT No.: PCT/FR2005/001757

§ 371 (c)(1),
(2), (4) Date: Jun. 11, 2007

(87) PCT Pub. No.: WO2006/016045

PCT Pub. Date: Feb. 16, 2006

(65) Prior Publication Data

US 2008/0031791 A1    Feb. 7, 2008
US 2009/0117018 A9    May 7, 2009

(30) Foreign Application Priority Data

Jul. 9, 2004 (FR) .................. 04 07721

(51) Int. Cl.
*B01D 11/00* (2006.01)
(52) U.S. Cl. .......................... 423/70; 423/73
(58) Field of Classification Search .................. 423/73, 423/70
See application file for complete search history.

(56) References Cited

U.S. PATENT DOCUMENTS

| | | | | |
|---|---|---|---|---|
| 4,021,531 A | * | 5/1977 | Besson et al. | 423/492 |
| 5,174,971 A | * | 12/1992 | Snyder et al. | 423/70 |
| 5,618,502 A | * | 4/1997 | Byers et al. | 423/70 |
| 5,762,890 A | * | 6/1998 | Byers et al. | 423/70 |

FOREIGN PATENT DOCUMENTS

| | | |
|---|---|---|
| DE | 1288576 | 2/1969 |
| FR | 2250707 | 6/1975 |
| FR | 2629360 | 10/1989 |
| FR | 2823740 | 10/2002 |
| WO | WO 97/04141 | 2/1997 |

* cited by examiner

*Primary Examiner*—Melvin C Mayes
*Assistant Examiner*—Melissa Stalder
(74) *Attorney, Agent, or Firm*—Davidson, Davidson & Kappel, LLC (57) ABSTRACT

A process for the separation and purification of hafnium and zirconium.

29 Claims, 5 Drawing Sheets

PROCESS FOR THE SEPARATION AND PURIFICATION OF HAFNIUM AND ZIRCONIUM

FIELD OF THE INVENTION

The present invention relates to a process allowing the separation and purification of hafnium and zirconium.

BACKGROUND INFORMATION

Zircon ore contains zirconium, as its major component, and hafnium (generally from 1 to 3% by weight). For its use in nuclear power, after carbochlorination of the ore, zirconium has to be purged as far as possible of hafnium, which is therefore found in the residual fractions of the processes for the purification of zirconium. The hafnium may, in turn, be used, and this necessitates the individual purification thereof.

For example, one of the most effective processes currently used for the purification of zirconium is that known as the process for separation in molten salts or extractive distillation in molten salts (FR-A-2 250 707 and FR-A-2 629 360). This process uses a distillation column having a plurality of plates, each supporting a layer of molten salts. A mixture of $ZrCl_4$ and $HfCl_4$, which is derived from the carbochlorination of the zircon ore, is introduced into the column in a gaseous state. A $ZrCl_4$ fraction is recovered in the solvent phase at the base of the column, whereas a residual fraction enriched with $HfCl_4$ is produced in the vapour phase at the top of the column. This residual fraction may thus, for example, comprise approximately 70% $ZrCl_4$ and 30% $HfCl_4$ (% by mass). An industrial plant operating in accordance with the principle may be reconditioned in order to treat this residual fraction and recover the hafnium, resulting in discontinuous operation of the plant.

Moreover, the demand of specific industries for ever-more-pure hafnium has also created a need for a process allowing large amounts of very pure hafnium to be purified.

SUMMARY

The invention aims to propose an improvement to the industrial process for the separation of zirconium/hafnium by extractive distillation in molten salts, also allowing the recovery and purification of the hafnium.

The invention also aims to propose an industrial process allowing large amounts of hafnium and zirconium to be purified efficiently. The invention thus aims to propose a process of this type allowing fractions enriched with hafnium having metal zirconium contents of less than or equal to 100 molar ppm, and even less than or equal to 50 molar ppm, expressed relative to the metal hafnium, to be produced.

The invention also aims to propose a process of this type that is capable of operating continuously.

The applicant found that the best results for the separation of hafnium from a powder mixture of $ZrCl_4$ and $HfCl_4$ derived from extractive distillation were obtained by carrying out the following steps: hydrolysis of this mixture in an aqueous solution of strong inorganic acid so as to form an aqueous solution having from 7 to 12 mol of acid per liter; passing the solution obtained in the preceding step into an anion-exchange resin, preferably a resin containing amino, ammonium or azine groups, the resin used preferably being preconditioned with an aqueous solution of strong inorganic acid having from 7 to 12 mol of acid per liter, then eluting and recovering a fraction of said aqueous solution having from 7 to 12 mol of acid per liter, which fraction is enriched with hafnium.

The invention therefore relates to a process for the separation and purification of hafnium and zirconium from a mixture containing $ZrCl_4$ and $HfCl_4$, comprising:

(1) introduction of the mixture of $ZrCl_4$ and $HfCl_4$ in vapour form into a continuous extractive distillation column;

(2) selective absorption of the $ZrCl_4$ and $HfCl_4$ vapours by an extraction solvent circulating in a counter-current to the stream of said vapours in the distillation column;

(3) drawing-off of a liquid or gaseous mixture of $ZrCl_4$ and $HfCl_4$ enriched with $ZrCl_4$;

(4) drawing-off of a liquid or gaseous mixture of $ZrCl_4$ and $HfCl_4$ enriched with $HfCl_4$;

(5) hydrolysis of the mixture obtained in step (4) in an aqueous solution of strong inorganic acid so as to form an aqueous solution having from 7 to 12 mol of acid per liter;

(6) passing the solution obtained in step (5) into an anion-exchange resin; and (7) eluting and recovering a fraction enriched with hafnium.

According to one aspect of the invention, the process for the separation of zirconium/hafnium takes as its starting point a mixture of $ZrCl_4$ and $HfCl_4$ derived from the carbochlorination of zircon ore. This ore conventionally contains a hafnium/zirconium % by weight ratio of between 1:99 and 3:97. According to an embodiment of the invention, the mixture of chlorides derived from the carbochlorination has been subjected to one or more treatments intended to remove specific metals or impurities.

Steps (1) to (4) correspond to a process for the purification of zirconium by extractive distillation. Examples of such a process are disclosed in FR-A-2 250 707, FR-A-2 629 360 and FR-A-2 823 740, documents to which a person skilled in the art may refer in order to carry out these steps. In step (1), the $ZrCl_4$ and $HfCl_4$ mixture is introduced in vapour form. According to a first embodiment, use is made of a solid mixture of $ZrCl_4$ and $HfCl_4$ as a starting material, the mixture is sublimated, and the $ZrCl_4$ and $HfCl_4$ vapours are introduced into the distillation column. Typically, the sublimation temperature is approximately 330° C. for a pressure of 1 atm. According to a second embodiment, use is made of a solution of $ZrCl_4$ and $HfCl_4$, the solution is evaporated, and the $ZrCl_4$ and $HfCl_4$ vapours are introduced into the distillation column. The evaporation temperature is dependent on the solvent for dissolving the tetrachlorides, and is generally between 200 and 550° C.

According to an advantageous embodiment, this introduction in vapour form into the column and the distillation in the column in step (2) are carried out under overpressure relative to the atmospheric pressure, and this overpressure may typically be between 0.0005 and 0.5 MPa, and may further be between 0.0005 and 0.15 MPa.

According to an advantageous embodiment, step (1) comprises (according to the teaching of FR-A-2 629 360):

a) dissolving said chlorides in a liquid solvent at atmospheric pressure and at the temperature $\Theta_1$ in order to obtain a solution having a given concentration, i.e. a calculable and adjustable concentration; a solvent allowing the tetrachlorides to be dissolved, for example one of those described below as an extraction solvent, is used;

b) transferring this solution, optionally with intermediate storing, in a storage tank;

c) pressurization and adjustment of the flow rate of this solution to constant values using known arrangements, for example using a volumetric pump or using a centrifugal pump supplemented with a flow meter or a flow controller;

d) introduction of this pressurised solution at a constant flow rate into an evaporator connected to the distillation column, said evaporator being at the pressure of the column at the supply point; and e) heating of the solution in this apparatus to a selected temperature $\Theta_2$, which is greater than $\Theta_1$ and is sufficient to vaporize most of said chlorides contained in the solution, the vapours then passing into said column at a stable and known flow rate.

The dissolving temperature $\Theta_1$ may be between 200 and 400° C., typically between 250 and 350° C. The pressure as from step c) may typically range up to 0.5 MPa, preferably up to 0.15 MPa, and may be between 0.0005 and 0.15 Mpa. The evaporation temperature $\Theta_2$ may be between 200 and 550° C., especially between 430 and 550° C., typically between 450 and 500° C.

FR-A-2 629 360 discloses in detail, with reference to its FIG. 1, a process and a device for the introduction of tetrachlorides in vapour form based on the embodiment that has just been described. This process and this device may be used for carrying out the invention.

According to one aspect of the invention, a liquid extraction solvent that is selected to have the maximum possible difference in volatility between the Zr tetrachlorides and the Hf tetrachlorides is used.

The extraction solvent may comprise a molten salt. The melting temperature of the salt determines the temperature at which the tetrachlorides are dissolved in the salt and the temperature in the distillation column. The temperature is selected such that the salt is at least substantially molten. This temperature will generally be between 200 and 400° C., typically between 250 and 350° C.

According to a first type, the extraction solvent comprises an alkali metal chloride and an acid metal chloride (metalloid or transition metal chloride). The alkali metal chloride may comprise as a metal Li, Na, K or Cs. K and Na are preferred for forming KCl and NaCl. The acid metal chloride is preferably $AlCl_3$ or $FeCl_3$, or a mixture of these two types. The aluminium chloride and/or iron chloride to alkali metal chloride molar ratio is typically greater than 0.95 and less than 1.30.

According to a first advantageous embodiment derived from FR-A-2 250 707, a substantially stoichiometric solvent having the following formula is used:

$nAlCl_3$, pNaCl or $nAlCl_3$, pKCl or $nFeCl_3$, pNaCl or $nFeCl_3$, pKCl or $n(AlCl_3, FeCl_3)$, pNaCl or $n(AlCl_3, FeCl_3)$, pKCl

The n/p ratio may be kept above 0.95 and may be between 1.04 and 1.10.

According to an exemplary method derived from FR-A-2 250 707, the above-mentioned solvents, which comprise potassium salts, are used.

According to an even further exemplary embodiment, derived from FR-A-2 629 360, potassium chloroaluminate $KAlCl_4$ or $(AlCl_3, KCl)$ is used. The evaporation rate produced by heating the solution between 430 and 550° C., preferably between 450 and 500° C., is greater than 70%, and typically between 80 and 95%, for a pressure between 0.0005 and 0.5 MPa, preferably between 0.0005 and 0.15 MPa, in the evaporator in which this pre-heating is carried out. Provided that the concentration, solution flow rate and heating temperature are stable, a flow rate of vapours of $ZrCl_4$ containing hafnium may easily be obtained in the column under stable pressure, which flow rate may be known to within 1% accuracy.

According to a further aspect, a different type of solvent is used in accordance with the teaching of FR-A-2 823 740. This extraction solvent comprises at least one alkali metal solvent of the type conventionally used in the extractive distillation of zirconium, i.e. such as at least one salt of an alkali metal chloride and an acid metal chloride A such as $AlCl_3$ or $FeCl_3$ (and this provides an alkali chloroaluminate or chloroferrate). One or more acid metal or metalloid chlorides B, which are weaker than that or those entering the composition of this "base solvent", are added to said "base solvent", thus producing an at least ternary molten salt. By definition, a chloride is said to be acidic if it is able to bind with $Cl^-$ ions. The term "weaker", with reference to the acidity of the metal chloride B, refers to the fact that the element bound to chlorine in this acid metal (or metalloid) chloride B has a lesser affinity for the $Cl^-$ ions than that of the element bound to chlorine in the acid metal chloride A. The acidity of the chloride or of a mixture of chlorides, i.e. its pCl defined by $pCl=-\log [Cl^-]$, may easily be determined from the measurement of the free potential of the chloride or the mixture. All that is required is to measure said potential on an aluminium wire relative to a reference electrode consisting of an aluminium wire steeped in an $AlCl_3$-KCl mixture saturated with KCl. The pCl is obtained by the formula: $E=E_0-(4RT/3F)\ln [Cl^-]$, wherein $E_0$=free potential of the chloride or mixture of chlorides, R=constant=8.314, T=temperature in Kelvins, F=Faraday constant and $\ln[Cl^-]$=Napierian logarithm of the $Cl^-$ ion concentration.

The acid metal or metalloid chlorides B are, in particular, selected from the alkaline-earth chlorides (for example Mg), the transition metal chlorides (for example Zn, Cu, Ni, Co and optionally Fe; Zn and Cu being preferred among the transition metals) or specific metalloids such as Pb and Sn. The acid metal chlorides B are at oxidation level II, for example. Advantageously, they also have a coordination number of 4 in the mixture. They are preferably magnesium chloride $MgCl_2$ and/or zinc chloride $ZnCl_2$.

In the "base solvent", the alkali metal chloride may comprise as a metal Li, Na, K or Cs. KCl and NaCl are preferred. The acid metal chloride A and the acid metal or metalloid chloride B are selected in keeping with the above-mentioned rule of the weakest acidity of B/A. Preferably, the acid metal chloride A is $AlCl_3$ and/or $FeCl_3$. The combinations $AlCl_3$+KCl and/or $FeCl_3$+NaCl may be used as the base solvent. It is possible to use $AlCl_3$ in the base solvent and an iron chloride as the acid metal or metalloid chloride B. In this case, the iron chloride may be $FeCl_2$.

According to any exemplary embodiments relating to this type of extraction solvent:

a base solvent:

$AlCl_3$ and/or $FeCl_3$ as the acid metal chloride A, preferably with KCl and/or NaCl as the alkali metal chloride;

more preferably $AlCl_3$+KCl and/or $FeCl_3$+NaCl;

an acid metal chloride B:

$MgCl_2$ and/or $ZnCl_2$ and/or $CuCl_2$, preferably $MgCl_2$ and/or $ZnCl_2$ are provided.

Advantageously, the acid metal chloride A (for example aluminium chloride and/or iron chloride) to alkali metal chloride molar ratio is between 0.7 and 1.3. It is preferably between 0.8 and 1. The acid metal or metalloid chloride B to acid metal chloride A (for example aluminium chloride and/or iron chloride) molar ratio is advantageously between 0.01 and 1.5, preferably between 0.1 and 0.3.

With this type of extraction solvent, the distillation may, in particular, be carried out at a temperature of between 250 and 550° C., preferably between 250 and 350° C.

Depending on what extraction solvent is used, the zirconium-rich mixture may be obtained at the top of the column in vapour form, or at the base of the column, in liquid form. The hafnium-rich mixture is obtained the other way round: at the base of the column, in liquid form, or at the top of the column, in vapour form. The mixtures may then be treated and passed into a condenser in order to recover the powder mixtures.

With the solvents of the first type, disclosed for example in FR-A-2 250 707 and FR-A-2 629 360, the zirconium-rich mixture is obtained in step (3) at the base of the column, whereas the vapours enriched with hafnium are recovered at the top of the column (step (4)). The gaseous ZrCl and HfCl$_4$ mixture enriched with HfCl$_4$ is introduced into a condenser, from which a powder mixture is recovered.

With the solvents of the second type, disclosed in FR-A-2 823 740, the hafnium-rich mixture is obtained in step (3) at the base of the column, whereas the vapours enriched with zirconium are recovered at the top of the column (step (4)). The gaseous ZrCl and HfCl$_4$ mixture enriched with ZrCl$_4$ is introduced into a condenser, from which a powder mixture is recovered.

The tetrachloride enriched at the base of the column (hafnium or zirconium depending on what solvent is used) may be recovered as follows. The enriched solution derived from the base of the column is introduced into a column, for example a stripping column, where it flows against a gas stream, for example nitrogen. The gas drives the vapours of the enriched tetrachloride toward the top of this column. According to any exemplary embodiment, this stream is then directed toward a condenser in order to recover the enriched tetrachloride in solid form. Thus, with an extraction solvent of the alkali chloroaluminate or alkalichloroferrate type, for example KAlCl$_4$ or (AlCl$_3$, KCl), the gas drives the vapours enriched with zirconium tetrachloride toward the condenser. In a variant, the gas drive is replaced by a slight reduction in pressure applied, for example, in the condenser, for example using a vacuum pump. According to one characteristic, the solution at the base of the stripping column may be recycled toward the top of the distillation column, for example through the absorber, which will be described below. According to a further characteristic, a boiler may be arranged between the base of the distillation column and the stripping column, allowing partial recirculation of the solvent at the base of the distillation column.

The enriched tetrachloride at the top of the column may be recovered as follows. The vapours enriched with hafnium or zirconium (depending on what solvent is used) pass from the distillation column into an absorber provided with a cooling device. This absorber allows a portion of the tetrachloride vapours to be dissolved in the solvent, while the remaining vapours are recovered. According to an exemplary embodiment, these vapours are then directed toward a condenser in order to recover in solid form a phase enriched with hafnium or zirconium tetrachloride (depending on what extraction solvent is used). Thus, with an extraction solvent of the alkali chloroaluminate or alkali chloroferrate type, for example KAlCl$_4$ or (AlCl$_3$, KCl), vapours enriched with hafnium tetrachloride are directed toward the condenser.

According to one characteristic, any aluminium that may be present is removed, such as both from the fraction enriched with hafnium and from the fraction enriched with zirconium. According to a first aspect, aluminium is removed from the vapours derived from the top of the column, upstream of the condenser if one is provided. According to a second aspect, aluminium is removed downstream of the stripping column and upstream of the condenser if one is provided. These two steps may be carried out. An example of the device for the removal of aluminium is that disclosed in FR-A-2 543 162.

According to one characteristic of the invention, the extractive distillation is carried out in order to produce a mixture Hf+Zr having the following composition:
  Zr/(Zr+Hf) ranging from 70 to 85 mol % (55 to 75% by mass)
  Hf(Zr+Hf) ranging from 15 to 30 mol % (25 to 45% by mass)

According to a first embodiment for carrying out step (5), a fraction enriched with hafnium obtained in powder form in the condenser is used. According to one characteristic, the solid enriched fraction obtained in the condenser is drawn off at the base of the condenser in order to supply step (5), in which said powder fraction is hydrolysed using the acid solution before being directed toward the resin in step (6). In an advantageous embodiment, drawing-off, hydrolysis and circulation toward the resin are carried out continuously.

According to a second embodiment, it is the enriched vapours obtained in step (4) that are used for step (5). According to one characteristic, these vapours are bubbled in the acid solution so as to hydrolyse the fraction, and the product of the hydrolysis is then conveyed toward the resin in step (6). In an advantageous embodiment, the vapours are conveyed continuously into the hydrolysis solution and the solution obtained is brought continuously toward the resin.

According to a preferred aspect, the resin used in step (6) is wetted (conditioned or preconditioned) with an aqueous solution of strong inorganic acid having from 7 to 12 mols of acid per liter. An exemplary embodiment consists in conditioning the resin with a solution comprising the same acid as in step (5) and having an acid concentration similar or identical to the solution obtained in this step.

Without wishing to be bound by the theory, it is believed that the so-called feed solution, obtained in step (5), contains zirconium compounds in anionic form and hafnium compounds generally in non-ionic form, and that, during the passage into the resin, the mainly zirconium-based anions are retained by the resin by an ion-exchange process so that, prior to the saturation of a certain proportion of the groups of the resin by the zirconium-based ions, the eluate issuing from the resin contains primarily the hafnium compounds.

The feed solution is therefore passed through the resin so as to produce an eluate, and a hafnium-rich fraction is recovered in the strong inorganic acid solution having from 7 to 12 mols of acid per liter. The degree of purity or hafnium enrichment may vary as a function of the moment at which the sample is taken, and a fraction or a plurality of fractions having different degrees of purity may therefore be recovered. A fraction having a metal zirconium content of less than or equal to 100 molar ppm expressed relative to the metal hafnium, a fraction having a content of less than or equal to 50 ppm, a fraction having a content of less than or equal to 30 ppm and optionally a plurality of these fractions may thus, for example, be recovered. According to an even more advantageous embodiment, a fraction having a purity of approximately 20 molar ppm of metal Zr relative to metal Hf is obtained.

This hafnium-rich fraction elution phase may be monitored during the purification process, in which case eluate samples are taken and the zirconium and/or hafnium compound content thereof monitored. The eluates may be analysed, for example, by ICP-AES (Inductively Coupled Plasma-Atomic Emission Spectroscopy) in order to determine the purity of the fractions with respect to hafnium or zirconium, and this allows the fractions to be selected, in particular, if necessary. Further information shall be provided in the detailed description. It is also possible to have a standardised mode of operation.

Once a specific degree of saturation of the groups of the resin has been reached, the eluate issuing from the resin tends on the whole to correspond to the feed solution. The resin may then be treated in order to be reconditioned and/or to recover the hafnium and zirconium metals still present.

According to one aspect of the invention, after step (7), the resin is cleaned [step (8)] in order to remove the zirconium and hafnium that were present in the interstices of the resin, without being bound thereto.

According to a first embodiment of this step (8), the resin is purged of its liquid content, for example by gravity or by ejection by means of air or gas (for example nitrogen).

According to a second embodiment of this step (8), a rinsing solution, which has the distinctive feature of not causing the unbinding of the zirconium compounds linked to the resin by ionic interaction, is circulated in the resin. A strong inorganic acid solution having from 7 to 12 mol of acid per liter and having a number of mol of acid per liter that is greater than or substantially identical to the feed solution formed in step (5) is preferably used. The term "substantially identical" refers to the fact that the acid concentration may vary relative to step (5), including toward lower values, while at the same time remaining within the limits that do not cause substantial unbinding of the zirconium compounds linked to the resin by ionic interaction. The same acid (for example HCl) as in step (5) is preferably used. The same acid concentration is also preferably used. The rinsing product may, in turn, be reintroduced in the process at step (5).

According to a third embodiment of step (8), the resin is first of all purged, for example by gravity or by ejection, then rinsed as has just been described.

According to an exemplary embodiment, step (8) is carried out just after the recovery of the hafnium-rich fraction or the last hafnium-rich fraction. The analysis of the eluates following the elution phase, as mentioned above, allows this moment at which it becomes unnecessary to continue the supply of zirconium and hafnium mixture to be determined.

According to one aspect of the invention, after step (8), washing with water or with an equivalent aqueous solution that allows the zirconium compounds linked to the resin by ionic interaction to be unbound is carried out and a zirconium-rich or zirconium-purified solution is recovered: step (9).

The term "equivalent aqueous solution" refers to an aqueous solution capable of unbinding the zirconium compound, for example an acid solution of lower strength than the solution used in the preceding steps, for example an aqueous solution comprising 0 to 7 mol, more particularly 0 to 6 mol, of acid per liter, which is selected so as to be less strong than the previously used solution.

According to a particular embodiment of this step (9), gradual unbinding is carried out using aqueous solutions having decreasing acid concentrations. Water is preferably used last of all. For example, at least one first unbinding is carried out using an appropriate acid aqueous solution (for example HCl 0.1 to 7, in particular 0.1 to 6 mol per liter) followed by a finishing unbinding with water.

The unbinding solution or solutions cause the unbinding of the metal compounds fixed to the resin by ionic interaction, and this step therefore allows one or more zirconium-rich or zirconium-purified fractions having metal Hf contents of, for example, less than or equal to 250, 50, 40, 25 or 10 molar ppm expressed relative to Zr+Hf to be recovered.

If the recovery of a zirconium-rich fraction is not retained, step (8) may be omitted and step (7) to step (9) carried out immediately.

The strong inorganic acid used in the various steps is defined as having a pKa relative to water of between −12 and 4. It is preferably selected from HCl and $H_2SO_4$. According to a preferred embodiment, the acid solution formed in step (5) and the acid solutions used in the other steps contain from 7.5 to 9.5 mol of acid per liter. The acid solutions used during the various steps are preferably similar or identical. According to the preferred embodiment of the invention, aqueous solutions of HCl, and especially solutions containing from 7.5 to 9.5 mol of acid per liter, are used in all of the steps.

The resin used comprises a solid phase, which resists the acid solutions used in the course of the process. All conventional organic resins containing cationic functional groups and of which the counter-ion (anion) is capable of exchanging with the anionic zirconium compounds present in the acid feed solution according to the invention are suitable. The groups are advantageously amino, ammonium and/or azine groups.

The organic resins may be strong or weak anionic resins. Their functional groups are represented by or comprise for example:

primary, secondary or tertiary amines, the substituents other than H preferably being selected from among linear or branched $C_1$ to $C_6$ alkyl, phenyl or alkylphenyl, alkyl being as defined above, linear or branched $C_1$ to $C_6$ hydroxyalkyl, and combinations thereof; in a preferred embodiment, the substituents other than H are alkyls;

quaternary ammoniums in which the substituents may be selected from among linear, branched or cyclic $C_1$ to $C_6$ alkyls, phenyl or alkylphenyl, alkyl being as defined above, linear or branched $C_1$ to $C_6$ hydroxyalkyl, and combinations thereof; in a preferred embodiment, the substituents are alkyls;

azines: nitrogenous heterocycles such as pyridine, 1,2-diabenzene (or pyridazine), 1,3-diabenzene (or pyrimidine), and 1,4-diazabenzene (or pyrazine), 1,2,3-triazabenzene (or 1,2,3-triazine), 1,2,4-triazabenzene (or 1,2,4-triazine), 1,3,5-triazabenzene (or 1,3,5-triazine), and the corresponding quaternary ammonium analogues obtained by substitution of the nitrogens by linear or branched $C_1$ to $C_6$ alkyl groups.

Resins may be used of which the counter-ion is of the same type as the acid used for the acid solution. With HCl, these resins are preferably used in chloride form (counter-ion $Cl^-$). With sulphuric acid, these resins may be in sulphate form (counter-ion $SO_4^-$).

According to a first embodiment, the solid phase is formed from resin in a particular form, for example in the form of more or less spherical beads having appropriate average particle dimensions or average diameters, generally between 30 and 800 micrometers. A person skilled in the art may select the polymer or copolymer forming the solid phase, its degree of crosslinking and the size of the particles. The resins used in the examples have demonstrated that average particle dimensions of between 100 and 700, or between 200 and 600, micrometers were suitable.

Examples of polymers and copolymers that may be used include those based on styrene, acrylate and methacrylate units. According to the invention, resins of the polystyrene, polyacrylate, polymethacrylate and polyacylate/polymethacrylate copolymer type may thus be used. Polystyrene-based resins are a preferred embodiment.

According to a second embodiment, the resin comprises inorganic particles functionalised by functions similar to those described for organic resins, in particular amines, quaternary ammoniums and azines (see above). The inorganic particles forming such a resin are, for example, silica particles, zeolites, aluminosilicates and mixtures thereof.

According to a third embodiment, the resin comprises inorganic particles (for example silica, zeolites, aluminosilicates and mixtures thereof), which are coated or contain at the surface a functionalised organic polymer or copolymer as described above.

The capacity of the resin to fix the metal ions, expressed in milliequivalent per ml of moist resin, is preferably greater than 0.5, better still greater than or equal to 1.

Step (4) and the following steps of the process of the invention do not require a complex installation. Step (5) and the following steps may thus be carried out in a column or in any container (referred to hereinafter as a column or the like) having a volume adapted to the volume of resin used, this volume itself being adapted to the solution to be treated, so as to purify the hafnium, from the same column or the like.

One operating parameter is the flow rate of the acid solution in the column or the like. The flow rate must not be too quick, so that the exchange of ions may take place properly. However, it has to be sufficient to promote a high hafnium concentration in the eluate in step (7) once the resin has been saturated with hafnium compounds. This parameter may thus easily be accommodated by simple routine tests and analysis of the eluates, for example by ICP-AES. A standardised process may also be provided. However, it may be specified that a flow rate of between 0.25 and 10, preferably between 2 and 5, volumes of acid solution per hour is suitable.

In the present description, the concept of "volume" refers to the volume of resin used. Thus, if reference is made to 2 volumes of solution, this means that a volume of solution representing twice the volume of the resin used is used.

After rinsing with water and/or with a low-strength acid solution in step (9), the resin may be reused for a new hafnium purification phase. According to a preferred embodiment, the resin is reconditioned by the acid solution and this allows the water or equivalent aqueous solution to be removed and the resin to be placed in optimum conditions for a new separation/purification cycle.

Before this reconditioning, the water or equivalent aqueous solution may previously be removed by gravity (purging) or by ejection by means of air or gas.

Although it is not a preferred option, it is possible to eliminate the conditioning of the resin in step (5). In this case, before the resin is reused, the water or equivalent aqueous solution derived from step (9) may optionally be removed by gravity (purging) or by ejection by means of air or gas.

The part of the process corresponding to step (5) and the following steps in which the resin is used is noteworthy in that the ion exchanges and the unbinding/washing are carried out without using alkali media. The process of the invention proves advantageous for the integrity and the preservation of the resin in so far as the resin is not exposed to changes from an acid pH to an alkali pH.

Under the operating conditions of step (5) and the following steps, temperature is not a critical parameter and the working temperature may thus advantageously be between 0 and 40° C., preferably between 15 and 25° C.

A further advantage of the invention is that the process is not sensitive to the presence of the ions found naturally in water (alkaline, alkaline-earth).

According to an exemplary embodiment, in an industrial plant for the purification of zirconium, a plurality of columns or the like, arranged in parallel and supplied one after another, are installed so that a ready-to-use column or the like, which may be conditioned or reconditioned and is ready to receive the solution to be treated derived from step (5), is always available. It is thus possible continuously to purify hafnium from the solution derived from the industrial plant for the purification of zirconium (steps (1) to (4)). The steps for the purification of hafnium, cleaning, for example rinsing with the acid solution, unbinding with the aqueous solution and reconditioning of the resin are provided as described above.

The installation used in step (5) and the following steps may operate by gravity; however, the solutions may through the columns or the like and, more preferably, the columns or the like are supplied through the base and the solutions are caused to circulate upwardly.

Step (5) and the following steps require little equipment, i.e. one or more column(s) or similar device(s) and injection and/or extraction pump(s).

The volume of the resin, the size of the columns or similar device(s), the particle-size distribution of the resin particles, the type thereof and the flow rate of the solutions are operating parameters that allow a person skilled in the art to optimise an installation as a function of the amounts of metal to be treated.

The pure compounds of zirconium or hafnium obtained are in the form of oxychloride solutions $ZrOCl_2$ and $HfOCl_2$. The methods for obtaining metal zirconium or metal hafnium from these oxychlorides exist and are known to a person skilled in the art. The oxychlorides may thus be transformed into hydroxides ($Zr(OH)_4$ or $Hf(OH)_4$), dehydrated and calcined into $ZrO_2$ and $HfO_2$, then carbochlorinated and reduced by the Kroll process, allowing metal Zr and Hf to be recovered (*Nouveau Traité de Chimie minérale*, Paul Pascal, Vol. IX, pages 254 to 269). According to another method, the oxychloride solution is evaporated first, then carbochlorination and reduction into metal are carried out.

The present invention also relates to the use of this process for the production of metal hafnium having a purity corresponding to a Zr content of less than or equal to 100 molar ppm, preferably less than or equal to 50, 30 and 20 molar ppm, relative to Hf.

It also relates to the use of this process for the production of metal zirconium having a purity corresponding to a metal Hf content of less than or equal to 250, 50, 40, 25 or 10 molar ppm expressed relative to Zr+Hf.

It also relates to the use of this process for the production of metal zirconium having a purity corresponding to a metal Hf content of less than or equal to 250, 50, 40, 25 or 10 molar ppm expressed relative to Zr+Hf, and of metal hafnium having a purity corresponding to a Zr content of less than or equal to 100 molar ppm, preferably less than or equal to 50, 30 and 20 molar ppm, relative to Hf.

BRIEF DESCRIPTION OF THE DRAWINGS

The invention will now be described in greater detail with reference to the embodiments described below, which are presented by way of non-limiting examples, and with reference to the accompanying drawings.

DETAILED DESCRIPTION

1.1 Organic Products

1.1.1 Zirconium and Hafnium Source

The zirconium/hafnium separation studies were carried out, on the one hand, from zirconium and hafnium tetrachlorides obtained after carbochlorination (Zr/Hf ratio by weight: 97.5/2.5), then extractive distillation.

Figure 6:
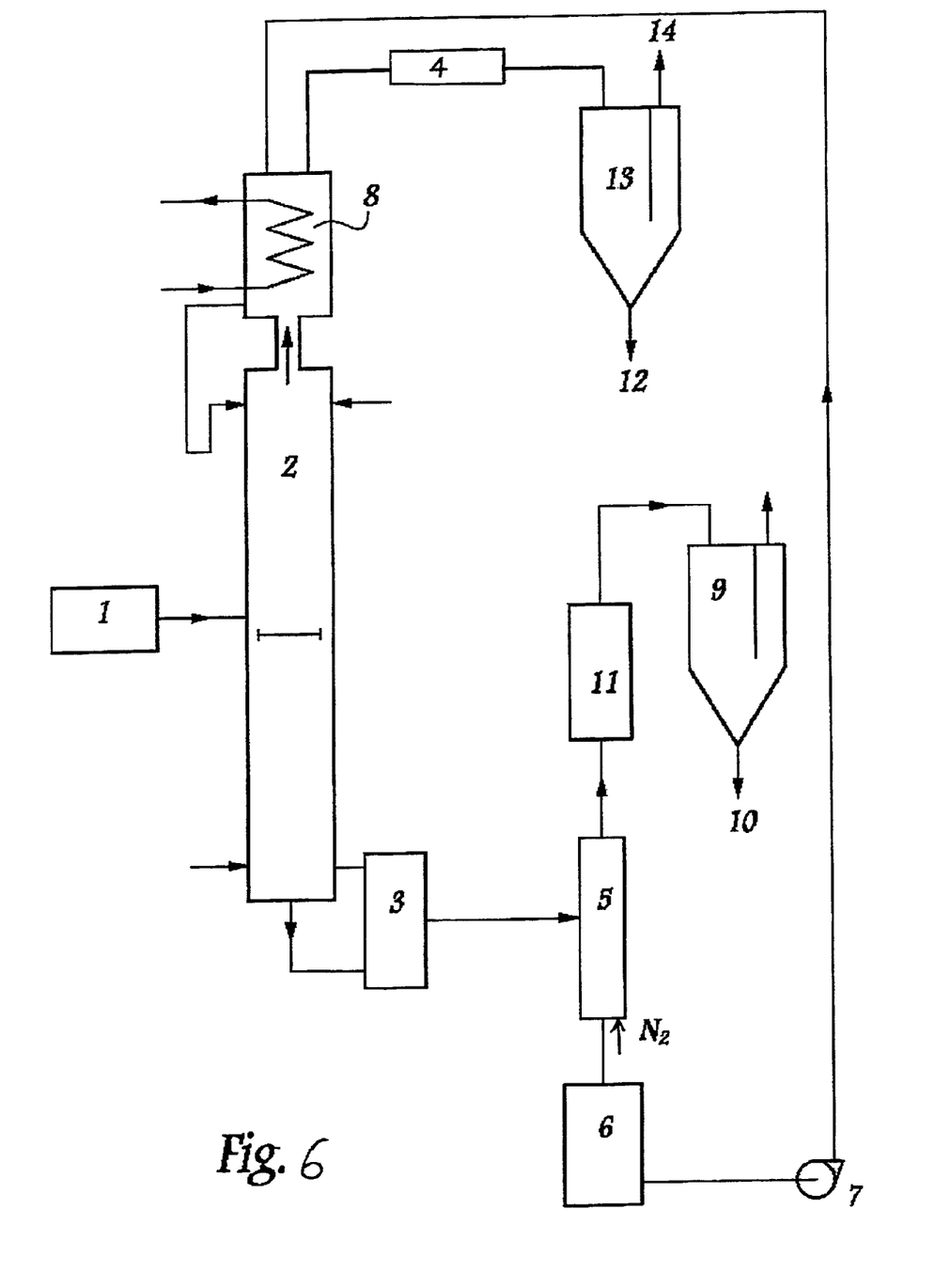
FIG. 6 is a diagram of an installation for the separation of Zr/Hf.
Figure 7:
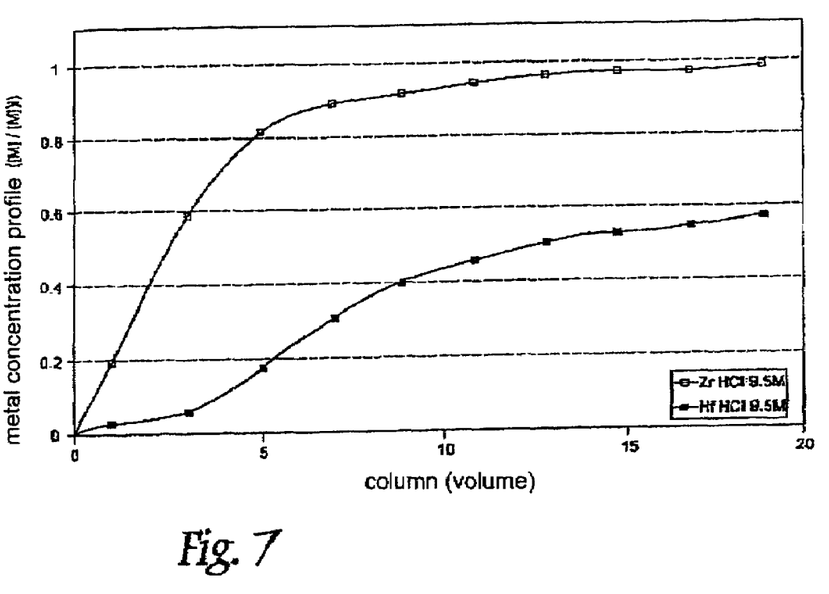
FIG. 7 is a graph of the results of a ICP-AES analysis of the fractions eluted during a process for separating a molar Zr/Hf 0.5/99.95 mixture on Amberjet® 4200 resin, with the analysed column volumes on the X-axis and the metal Zr or metal Hf concentrations on the Y-axis.

FIG. 6 illustrates the equipment in which the extractive distillation leading to the separation of $ZrCl_4$ and $HfCl_4$, according to the teaching of FR-A-2 250 707 and FR-A-2 629 360, is carried out.

The installation comprises a means 1 for feeding a distillation column 2, with zirconium tetrachloride vapours containing hafnium tetrachloride (temperature between 430 and 550° C.). A pump 7 upwardly circulates the extraction solvent according to the invention in the distillation column, in a counter-current to the stream of the zirconium and hafnium tetrachloride vapours. When the circuit is closed, this solvent passes through the absorber 8, the column 2, the boiler 3, the stripping column 5 and the tank 6, from which it is returned by the pump 7 toward the absorber 8.

The solvent used is a potassium chloroaluminate complex $KAlCl_4$ (KCl, $AlCl_3$ mixture) of very low volatility.

The vapours that have enriched with hafnium tetrachloride during their rise in the column 2 by exchange with the solvent circulating in a counter-current, leave the column 2 at its upper part, then pass through the absorber 8, in which they saturate the solvent. This apparatus is cooled by a thermostatic circuit, which controls its temperature between 300 and 350° C. A fraction of these vapours, which is not retained by the solvent, is released from the absorber 8. This fraction, which may contain an $AlCl_3$ residue, passes through a device 4 for trapping aluminium, as disclosed for example in FR-A-2 543 162, and condenses in the condenser 13, which is connected to the atmosphere via a vent pipe 14 and comprises a drawing-off arrangement 12, which allows the condensation product enriched with hafnium tetrachloride to be drawn off.

At the base of the column 2, the boiler 3, the temperature of which is adjusted to approximately 500° C., receives the zirconium tetrachloride solution in the solvent, the hafnium tetrachloride content of which has been reduced during its descent through the column 2. This solution passes from the boiler 3 into the stripping column 5. In the stripping column 5, the zirconium tetrachloride having a reduced hafnium tetrachloride content is extracted from the solvent by means of a nitrogen stream, upwardly circulating in this column in a counter-current to the stream of the solvent, and driving the zirconium tetrachloride vapours, which are thus extracted from the solvent, toward the upper part. These vapours, which may contain an $AlCl_3$ residue, are driven by the nitrogen stream through a device 11 for trapping aluminium as disclosed, for example, in FR-A-2 543 162. At the outlet of this device 11, the zirconium tetrachloride vapours are driven into the condenser 9 and the purified zirconium tetrachloride is drawn off at 10.

This equipment provides a powder enriched with hafnium (in tetrachloride form) at Zr/Hf ratios varying according to the operating conditions and the exact installation arrangement. For the purposes of the experiment, a powder having a Zr/Hf molar ratio of 70/30 was produced.

1.1.2 Resins

The resins used for the solid/liquid extraction of zirconium and hafnium are resins of the quaternary ammonium and azine type.

The resin Dowex®1X8 is a trimethylated ammonium chloride grafted onto a styrene-DVB matrix, with a functionalisation rate of 3.5 meq/g of dry resin. The resin Dowex® 1X8 is supplied by Aldrich. Particle-size distribution: 150 to 300 micrometers.

The resin Reillex™ HPQ is an N-methyl-poly-(4-vinylpyridine) chloride. Its maximum capacity is 4 meq/g of dry resin. Its water content is from 67% to 75%. Particle-size distribution: 250 to 595 micrometers.

The resin Reillex™ PVP 402 is a polyvinylpyridine. Its maximum capacity is 5 meq/g of dry resin. Its water content is from 50% to 60%.

The resin Amberjet™ 4200. The resins Reillex™ HPQ and Reillex™ HPQ are produced by Reilly.

Structures of the resins used:

a-Dowex®1X8 b-Reillex™ HPQ c-Reillex™ PVP 402)

-a-

-b-

-c-

1.1.3 Solvent

Hydrochloric acid 37% by weight in water.

1.2 ICP-AES Analyses

The aqueous phases were analysed by ICP-AES (inductively coupled plasma-atomic emission spectroscopy). The measurements were taken on a Spectro D spectrophotometer from Spectro. The zirconium was measured at a wavelength of 339.198 nm and the hafnium at 282.022 nm. The degree of uncertainty on the measurements was +/−0.2 mg/l.

1.3 Definitions of the Constants Used in Solid-Liquid Extraction

Ci: Initial metal concentration (mg/l)

Cf: Final metal concentration (mg/l)

$Vol_{aq}$: Volume of the aqueous phase on contact with the resin m: Resin mass

E: Extraction (%)

D: Distribution coefficient (ml/g)

D(Zr): Distribution coefficient of the zirconium (ml/g)

D(Hf): Distribution coefficient of the hafnium (ml/g)

The extraction percentage is defined by the following formula:

$$E + \frac{(Ci - Cf)}{Ci} \cdot 100$$

The extraction properties of the complexing agents used relative to zirconium and hafnium were assessed by comparing the distribution coefficients. This constant was determined experimentally by titration of the aqueous phase before and after extraction.

$$D + \left[\frac{Ci - Cf}{Cf}\right] \cdot \left[\frac{Vol_{aq}}{m}\right]$$

Selectivity S(Zr/Hf) of zirconium relative to hafnium is defined as the ratio of the distribution coefficients D(Zr) and D(Hf).

$$S(Zr/Hf) = \frac{D(Zr)}{D(Hf)}$$

1.4 Experiments

1.4.1 Preparation of the Aqueous Phase

Aqueous solutions were prepared by magnetic stirring, by dissolving zirconium and hafnium tetrachloride powder in hydrochloric acid solutions so as to obtain concentrations varying from 0 to 12 mol/l.

1.4.2 Mode of Operation

The separation of the zirconium and hafnium was carried out by solid-liquid extraction with resins. The flasks were stirred for 10 minutes using a horizontal mechanical stirrer of the Vibramax® 100 type (Bioblock scientific). The experiments were carried out at ambient temperature. The aqueous phases were then titrated by ICP-AES. It was possible to determine the extraction percentages and the distribution coefficients of the zirconium and hafnium. The re-extraction was carried out with distilled water. The ICP-AES titration of this aqueous phase allows the re-extraction percentage for Zr and Hf to be calculated. The aqueous phases were then stirred with the extracting agent (resin) in order to carry out the extraction. The HCl concentration was controlled in all of the solutions by the acid-base dosage of the aqueous phase using 0.5 mol/l sodium hydroxide in the presence of phenolphthalein.

1.5 Results

1.5.1 Effect of the HCl Concentration on the 70/30 Molar Zirconium/Hafnium Separation with Dowex®1X8 Resin

TABLE 1

Effect of the HCl concentration on the Zr/Hf separation with Dowex ®1X8 resin: [Zr] = 2500 mg/l; Dowex ®1X8 resin: m = 1 g; $vol_{aq}$ = 10 ml; stirring = 10 min; ambient temperature.

| [HCl] mol/l | Zr extraction (%) | Hf extraction (%) | D(Zr) (ml/g) | D(Hf) (ml/g) | S (Zr/Hf) |
|---|---|---|---|---|---|
| H₂O | 0.62 | 0.41 | 0.06 | 0.04 | ND |
| 5 | 1.97 | 1.32 | 0.20 | 0.13 | ND |
| 7 | 1.01 | 0.89 | 0.10 | 0.09 | ND |
| 8.5 | 6.99 | 1.41 | 0.75 | 0.14 | 5.36 |
| 9.5 | 31.96 | 8.49 | 4.70 | 0.93 | 5.05 |
| 12 | 44.46 | 29.87 | 8.00 | 4.26 | 1.88 |

ND: Not determined because the extraction percentage was too low.

ND: Not determined because the extraction percentage was too low.

When the HCl concentration increased, an increase in the distribution coefficients was observed (Table 1).

The optimum was obtained for the 9.5 mol/l HCl concentration: large differential between D(Zr) and D(Hf) and high selectivity S(Zr/Hf).

1.5.2 Effect of the HCl Concentration on the 70/30 Molar Zirconium/Hafnium Separation with Reillex™ HPQ Resin

TABLE 2

Effect of the HCl concentration on the Zr/Hf separation with Reillex ™ HPQ resin
[Zr] = 2500 mg/l; Reillex ™ HPQ resin: m = 1 g;
$vol_{aq}$ = 10 ml; stirring = 10 min; ambient temperature.

| [HCl] mol/l | Zr extraction (%) | HF extraction (%) | D(Zr) (ml/g) | D(Hf) (ml/g) | S (Zr/Hf) |
|---|---|---|---|---|---|
| H₂O* | 17.78 | 19.32 | 0.42 | 0.47 | 0.89 |
| 2.5* | 19.60 | 19.15 | 0.46 | 0.45 | 1.02 |
| 5* | 19.03 | 19.71 | 0.46 | 0.48 | 0.96 |
| 7 | 8.43 | 4.86 | 0.88 | 0.49 | 1.79 |
| 8.5 | 49.02 | 11.95 | 9.28 | 1.31 | 7.08 |
| 9.5 | 73.59 | 41.82 | 27.43 | 7.08 | 3.87 |
| 12 | 95.53 | 90.94 | 210.01 | 98.67 | 2.13 |

When the HCl concentration increased, an increase in the distribution coefficients was observed (Table 2). It should be noted that the experiments with HCl concentrations of between 0 and 5 mol/l were carried out with 5 g of resins, in order to observe better extractions and thus to have more precise information regarding the distribution coefficients and the selectivities. The optimum was obtained for 8.5 and 9.5 mol/l HCl concentrations.

1.5.3 Effect of the HCl Concentration on the 70/30 Molar Zirconium/Hafnium Separation with Reillex™ 402 PVP.

TABLE 3

Effect of the HCl concentration on the Zr/Hf separation with Reillex ™ 402 PVP resin:
[Zr] = 2500 mg/l; Reillex ™ 402 PVP resin: m = 1 g;
$vol_{aq}$ = 10 ml; stirring = 10 min; ambient temperature.

| [HCl] mol/l | Zr extraction (%) | Hf extraction (%) | D(Zr) (ml/g) | D(Hf) (ml/g) | S (Zr/Hf) |
|---|---|---|---|---|---|
| H₂O | 5.44 | 5.42 | 0.54 | 0.53 | 1.02 |
| 2.5 | 4.23 | 3.47 | 0.41 | 0.33 | 1.24 |
| 5 | 5.95 | 5.68 | 0.60 | 0.57 | 1.05 |
| 7 | 5.59 | 3.63 | 0.57 | 0.36 | 1.58 |
| 8.5 | 10.32 | 3.97 | 1.08 | 0.39 | 2.77 |
| 9.5 | 70.25 | 21.31 | 22.1 | 2.54 | 8.70 |
| 12 | 99.29 | 97.78 | 1280 | 405.1 | 3.16 |

When the HCl concentration increased, an increase in the distribution coefficients of the zirconium and hafnium was observed (Table 3). The optimum was obtained for the 9.5 mol/l HCl concentration.

1.5.4 Study of the Re-Extraction of Zirconium and Hafnium with Reillex™ HPQ Resin A study of the re-extraction with distilled water was carried out

TABLE 4

Re-extraction of Zr and Hf from Reillex ™ HPQ resin with distilled water
[Zr] = 2500 mg/l; [HCl] = 7 mol/l; $vol_{aq}$ = 10 ml;
stirring = 10 min; ambient temperature

| Reillex ™ HPQ (g) | Zr extraction (%) | Hf extraction (%) | Zr Re-extraction (%) | Hf re-extraction (%) |
|---|---|---|---|---|
| 0.045 | 12.77 | 0.97 | quantitative | quantitative |
| 0.090 | 22.96 | 3.08 | quantitative | quantitative |
| 0.225 | 51.61 | 12.06 | quantitative | quantitative |
| 0.450 | 76.30 | 28.18 | quantitative | quantitative |

The zirconium and hafnium were quantitatively well extracted with a volume of distilled water.

1.5.5 Influence of the Quality of the Water on the Zirconium/Hafnium Separation

The Zr/Hf separation by solid-liquid extraction was studied for solutions prepared from bidistilled water and industrial water (presence of alkaline substances and alkaline earths). $ZrCl_4/HfCl_4$ mixture having a 70/30 molar ratio in hydrochloric acid having a concentration of 9.5 mol/l.

TABLE 5

Zr/Hf separation with Dowex ®1 X8 resin
[Zr] = 2500 mg/L; resin mass 1 g; [HCl] = 9.5 mol/L;
$vol_{aq}$ = 20 ml; stirring = 10 min; ambient temperature

| Type of water | Zr extraction (%) | Hf extraction (%) | D(Zr) (ml/g) | D(Hf) (ml/g) | S (Zr/Hf) |
|---|---|---|---|---|---|
| Distilled water | 85.9 | 49.0 | 121.6 | 19.2 | 6.3 |
| Natural water | 85.0 | 48.5 | 113.2 | 18.9 | 6.0 |

There was no difference between the results obtained with distilled water and those obtained with natural water (Tables 5 and 6): this shows that the process is not sensitive to the presence of the ions naturally present in water. The re-extraction was quantitative with a volume of water.

2. Example of Zr/Hf Separation Using Resins in a Column 2.1 Zr/Hf Separation with a Dowex®1X8 Resin Column 2.1.1 From a (70/30 Molar) Zr/Hf Mixture 80 ml of Dowex®1X8 resin were placed in a column. The resin was then conditioned in 9.5 mol/l hydrochloric acid (5 volumes).

(70/30 molar) $ZrCl_4/HfCl_4$ powder was dissolved in an HCl acid solution [9.5 mol/l] in order to achieve a concentration of 10 g/l expressed in $ZrCl_4/HfCl_4$ powder. This solution was passed into the resin. When the Zr/Hf acid solution started to become eluted, samples were taken at the outlet of the column and analysed (FIG. 1).

Figure 1:
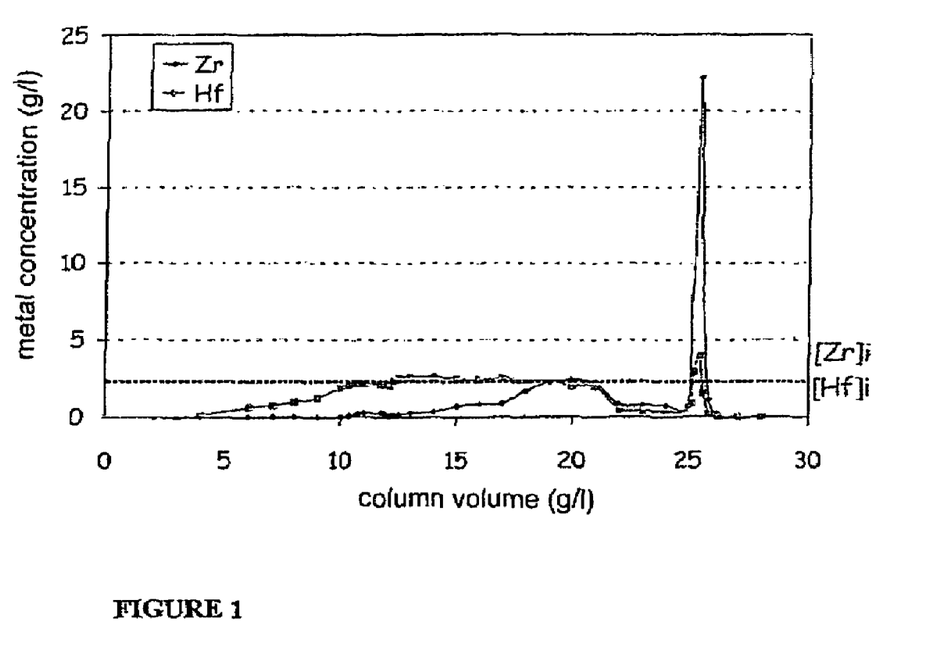
FIG. 1 is a graph of the results of a ICP-AES analysis of the fractions eluted during a process for separating a molar Zr/Hf 70/30 mixture on Dowex®1X8 resin, with the analysed column volumes on the X-axis and the metal Zr or metal Hf concentrations on the Y-axis.

As may be seen from FIG. 1, the hafnium was eluted first of all. The zirconium elution only started around the 10th volume, so that highly purified hafnium could be recovered between the 5th and 10th volumes. The hafnium purity reached 99.87%.

The resin column was then washed (21st volume) with hydrochloric acid [9.5 mol/l] in order to remove the traces of metal remaining in the interstices of the resin. A fraction or intermediate portion comprising zirconium compounds and hafnium compounds in a 40/60 Zr/Hf molar proportion was recovered.

The resin was then treated with distilled water (25th volume), thus causing the unbinding of the metal compounds bound to the resin. This unbinding corresponds to the peak that may be seen in FIG. 1 around the 25th volume. The average Zr/Hf molar ratio was 85/15 in the aqueous phase.

2.1.2 Purification of Hafnium from a Zr/Hf Mixture (40/60)

The intermediate portion of the preceding column (volumes 20 to 24), having a (40/60 molar) Zr/Hf proportion, was eluted on a second column containing 40 ml of Dowex®1X8 resin conditioned with 9.5 mol/l hydrochloric acid.

Figure 2:
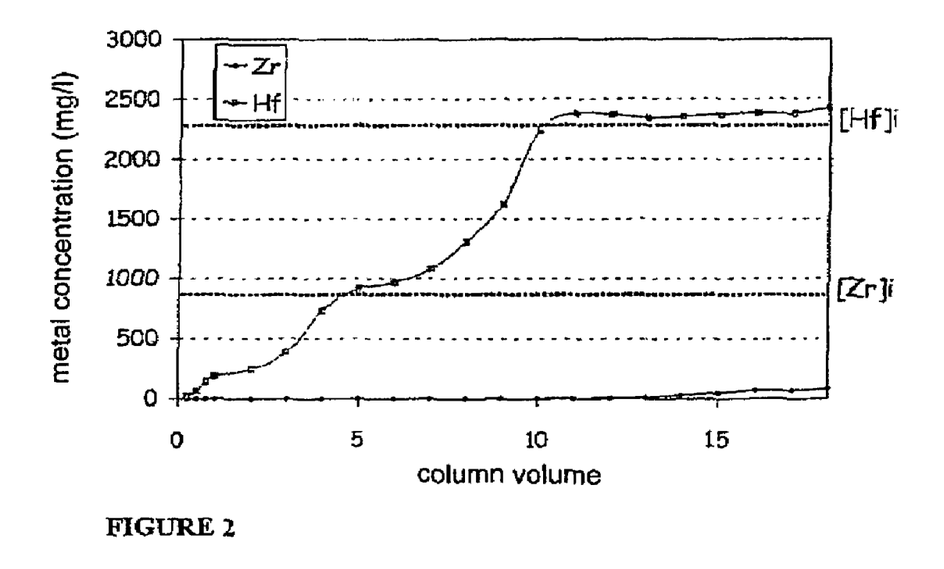
FIG. 2 is a graph of the results of a ICP-AES analysis of the fractions eluted during a process for separating a molar Zr/Hf 40/60 mixture on Dowex®1 X8 resin, with the analysed column volumes on the X-axis and the metal Zr or metal Hf concentrations on the Y-axis.

FIG. 2 shows that the maximum hafnium elution was reached around the 11th volume. It was possible to recover the hafnium with a purity of 99.87%.

2.1.3 Zr/Hf Separation with a Reillex™ HPQ Column 115 ml of Reillex™ HPQ resin were placed in a column. The resin was then conditioned in 9.5 mol/l hydrochloric acid (5 volumes).

(70/30 molar) $ZrCl_4/HfCl_4$ powder was dissolved in an HCl acid solution [9.5 mol/l] in order to achieve a concentration of 10 g/l expressed in $ZrCl_4/HfCl_4$ powder. This solution was passed into the resin. Once this acid solution started to become eluted, samples were taken at the outlet of the column.

Figure 3:
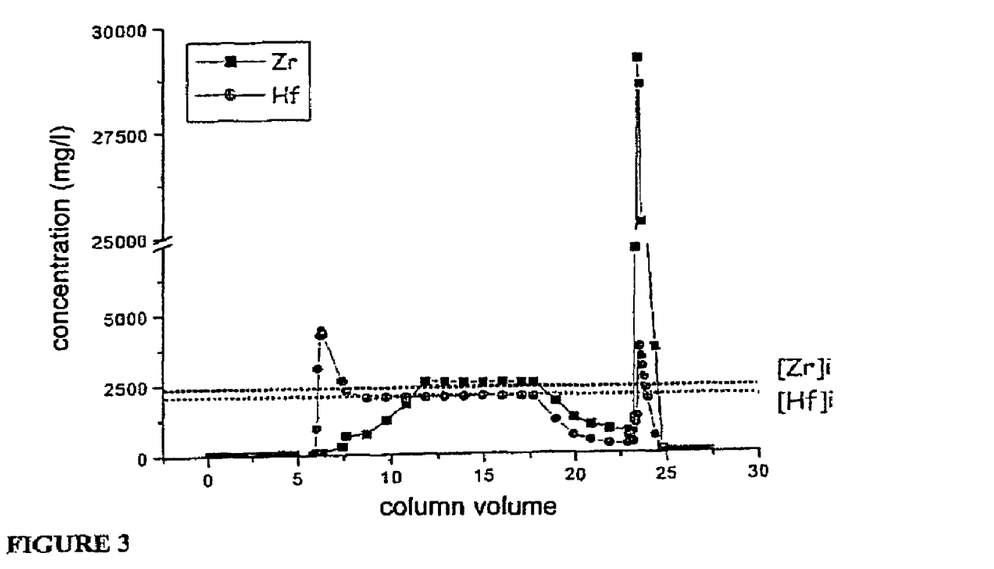
FIG. 3 is a graph of the results of a ICP-AES analysis of the fractions eluted during a process for separating a molar Zr/Hf 70/30 mixture on Reillex®HPQ resin, with the analysed column volumes on the X-axis and the metal Zr or metal Hf concentrations on the Y-axis.

FIG. 3 shows the elution profile with a hafnium peak around the 6th volume. The hafnium could be recovered with an average purity of 91%. The zirconium was then eluted.

The resin column was then washed with hydrochloric acid [9.5 mol/l] in order to remove the traces of metals remaining in the interstices of the resin.

The unbinding was then carried out with water. 2 volumes were required in order to recover all of the zirconium fixed to the resin. The zirconium was obtained with a purity of 93.7%.

2.1.4 Zr/Hf Separation with a Reillex™ PVP 402 Column 80 ml of Reillex™PVP 402 resin were placed in a column. The resin was then conditioned in 9.5 mol/l hydrochloric acid (5 volumes).

(70/30 molar) $ZrCl_4/HfCl_4$ powder was dissolved in an HCl acid solution [9.5 mol/l] in order to achieve a concentration of 10 g/l expressed in $ZrCl_4/HfCl_4$ powder. This solution was passed into the resin. Once this acid solution started to become eluted, samples were taken at the outlet of the column.

Figure 4:
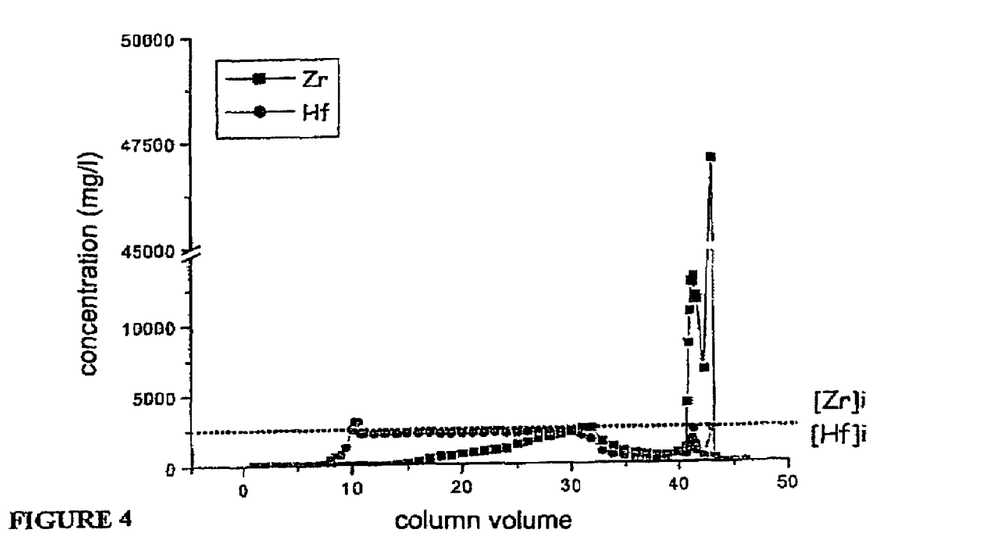
FIG. 4 is a graph of the results of a ICP-AES analysis of the fractions eluted during a process for separating a molar Zr/Hf 70/30 mixture on Reillex®402PVP resin, with the analysed column volumes on the X-axis and the metal Zr or metal Hf concentrations on the Y-axis.

As provided in FIG. 4, the purified hafnium could be recovered from the 10th volume. The hafnium could be recovered with a purity of 99.95%.

The resin column was then washed with hydrochloric acid [9.5 mol/l] in order to remove the traces of metals remaining in the interstices of the resin.

The zirconium bound to the resin was then recovered using an HCl concentration gradient. A 7 mol/l HCl volume was eluted and allowed zirconium having a purity of 94% to be collected. Then, with a volume of distilled water, the recovered zirconium had a purity of 97.5%. With this column of Reillex™PVP resin, the average Zr/Hf molar ratio was 96/4.

Figure 5:
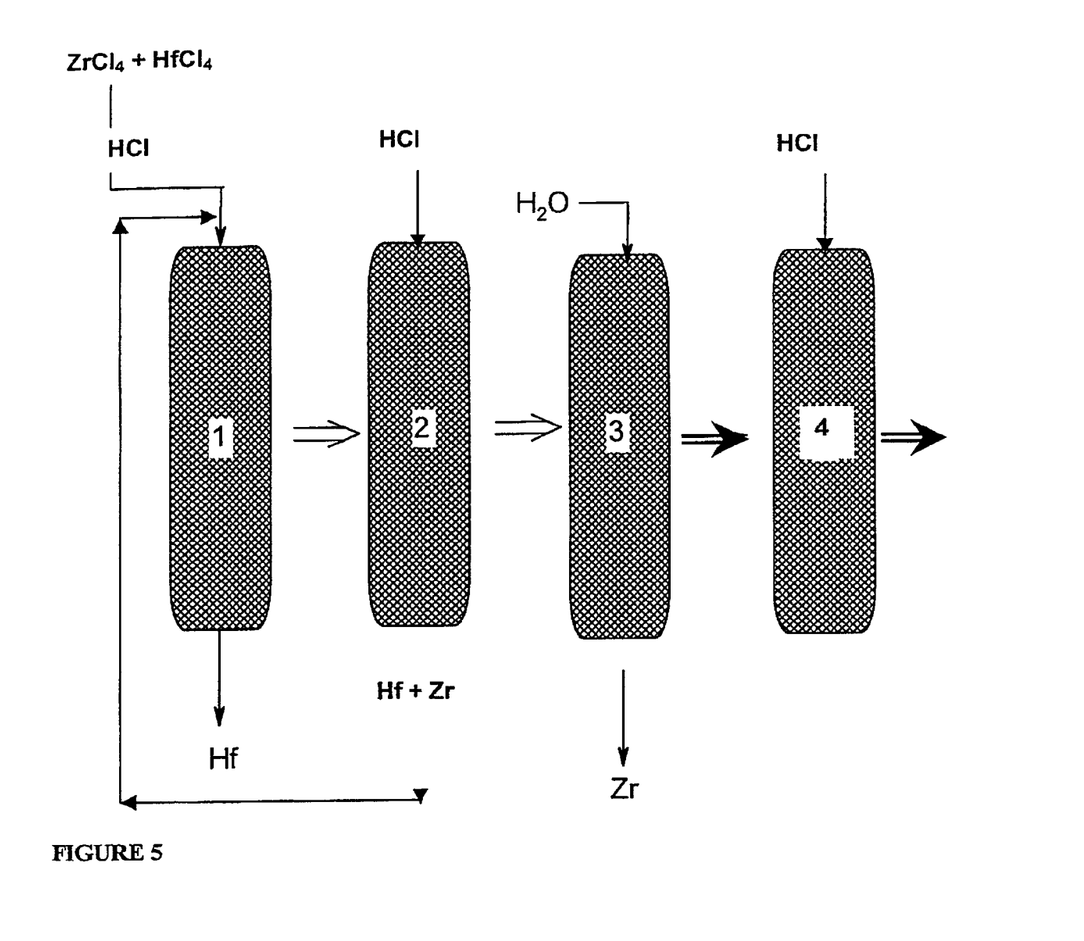
FIG. 5 is a diagram of a process for the separation of hafnium after step (4).

3. Description of an Installation Operating According to the Principle of the Invention FIG. 5 is a simplified diagram of a process according to the invention allowing hafnium and zirconium to be purified. The mixture of zirconium and hafnium tetrachlorides in a 70/30 molar ratio, drawn off at 12 in FIG. 6, was dissolved in 9.5 N hydrochloric acid. This solution was introduced into the column, which contained a resin according to the invention preconditioned with HCl. The hafnium was not retained by the resin and was therefore recovered at the outlet of the column (step 1 in the figure). Once the resin had become saturated with zirconium, it was washed with HCl (step 2 in the figure) and the washing product was recovered in order then to be retreated as in step 1. Step 3 in the figure represents the washing with water, and this allows the zirconium to be unbound and recovered. The column was then regenerated (step 4 in the figure) and could be reused after a new conditioning with HCl.

4. Separation from a 0.05/99.95 Zr/Hf Molar Mixture

The hafnium tetrachloride powder was dissolved in a hydrochloric acid solution in order to obtain a Hf concentration of 4.5 g/l and a hydrochloric acid concentration of 9.5 mol/l. 25 ml of Amberjet 4200® resin were placed in a column. The resin was conditioned with 9.5 mol/l hydrochloric acid. The Amberjet 4200® resin was saturated with the aqueous solution of the Zr and Hf compounds. Once this solution started to become eluted, samples were taken at the outlet of the column. FIG. 6 shows the Hf and Zr profile.

The Hf could be recovered with a purity of 99.99%.

It will be understood that the invention defined by the accompanying claims is not limited to the particular embodiments indicated in the foregoing description, but encompasses the variants thereof, which depart neither from the scope, nor from the spirit of the present invention.

The invention claimed is:

1. A process for separation of hafnium and zirconium from a mixture containing $ZrCl_4$ and $HfCl_4$, the process comprising:

introducing the mixture of $ZrCl_4$ and $HfCl_4$ in vapour form into a continuous extractive distillation column;

selective absorption of the $ZrCl_4$ and $HfCl_4$ vapours by an extraction solvent circulating in a counter-current to a stream of the vapours in the distillation column;

drawing-off of one of a liquid and gaseous mixture of $ZrCl_4$ and $HfCl_4$ enriched with $ZrCl_4$;

drawing-off of one of a liquid and gaseous mixture of $ZrCl_4$ and $HfCl_4$ enriched with $HfCl_4$;

hydrolysis of one of the mixture obtained in the step of drawing-off of one of a liquid and gaseous mixture of $ZrCl_4$ and $HfCl_4$ enriched with $HfCl_4$ in an aqueous solution of strong inorganic acid to form an aqueous solution having from 7 to 12 mol of acid per liter;

passing the aqueous solution into an anion-exchange resin; and eluting and recovering a fraction enriched with hafnium.

2. The process according to claim 1, wherein use is made of a solid mixture of $ZrCl_4$ and $HfCl_4$ as a starting material, the mixture is sublimated, and the $ZrCl_4$ and $HfCl_4$ vapours are introduced into the distillation column.

3. The process according to claim 1, wherein use is made a solution of $ZrCl_4$ and $HfCl_4$ as a starting material, the mixture is evaporated, and the $ZrCl_4$ and $HfCl_4$ vapours are introduced into a distillation column.

4. The process according to claim 1, wherein the solvent comprises one of $KAlCl_4$ and $AlCl_3$, KCl.

5. The process according to claim 1, wherein, during the drawing off of one of a liquid and gaseous mixture of $ZrCl_4$ and $HfCl_4$ enriched with $ZrCl_4$, a liquid mixture of $ZrCl_4$ and $HfCl_4$ enriched with $ZrCl_4$ is drawn off at a base of the column and, during a drawing-off of one of a liquid and gaseous mixture of $ZrCl_4$ and $HfCl_4$ enriched with $HfCl_4$, gaseous mixture of $ZrCl_4$ and $HfCl_4$ enriched with $HfCl_4$ is drawn off at a top of the column.

6. The process according to claim 1, wherein, during the drawing-off of one of a liquid and gaseous mixture of $ZrCl_4$ and $HfCl_4$ enriched with $ZrCl_4$, a gaseous mixture of $ZrCl_4$ and $HfCl_4$ enriched with $ZrCl_4$ is drawn off at a top of the column and; during a drawing-off of one of a liquid and gaseous mixture of $ZrCl_4$ and $HfCl_4$ enriched with $HfCl_4$, a liquid mixture of $ZrCl_4$ and $HfCl_4$ enriched with $HfCl_4$ is drawn off at a base of the column.

7. The process according to claim 1, wherein one of the liquid and gaseous mixture of $ZrCl_4$ and $HfCl_4$ enriched with $ZrCl_4$ and at least one of with $HfCl_4$ is subjected to a treatment involving passing into a condenser in order to produce a powder mixture.

8. The process according to claim 7, wherein, during a step of the hydrolysis of the mixture, the powder mixture of $ZrCl_4$ and $HfCl_4$ enriched with $HfCl_4$ is dissolved in the aqueous solution of strong inorganic acid.

9. The process according to claim 5, wherein, during a step of the hydrolysis of the mixture, the gaseous mixture of $ZrCl_4$ and $HfCl_4$ enriched with $HfCl_4$ is caused to bubble in the aqueous solution of strong inorganic acid.

10. The process according to claim 1, wherein in passing the aqueous solution into an anion-exchange resin, the resin is conditioned with an aqueous solution of strong inorganic acid having 7 to 12 mol of acid per liter.

11. The process according to claim 1, wherein the strong inorganic acid is selected from the group consisting of HCl and $H_2SO_4$.

12. The process according to claim 11, wherein the strong inorganic acid is HCl.

13. The process according to claim 1, wherein the aqueous acid solution contains from 7.5 to 9.5 mol of acid per liter.

14. The process according to claim 10, wherein the anion-exchange resin contains one of amino, ammonium and azine groups.

15. The process according to claim 10, wherein the anion-exchange resin is in chloride form.

16. The process according to claim 1, wherein during eluting and recovering a fraction enriched with hafnium, one or more hafnium-rich fractions are recovered.

17. The process according to claim 16, wherein a hafnium-rich fraction comprising a zirconium content of less than or equal to 100 molar ppm expressed relative to Hf is recovered.

18. The process according to claim 17, wherein a hafnium-rich fraction comprising a zirconium content of less than or equal to 50 molar ppm expressed relative to Hf is recovered.

19. The process according to claim 18, wherein a hafnium-rich fraction comprising a zirconium content of less than or equal to 30 molar ppm expressed relative to Hf is recovered.

20. The process according to claim 19, wherein a hafnium-rich fraction comprising a zirconium content of less than or equal to 20 molar ppm expressed relative to Hf is recovered.

21. The process according to claim 1, wherein, after eluting and recovering a fraction enriched with hafnium, the zirconium and hafnium contained in interstices of the resin, without being bound thereto by ionic interaction, are removed.

22. The process according to claim 21, wherein during the removal of the zirconium and hafnium contained in the interstices, the resin is rinsed using a strong inorganic acid solution having from 7 to 12 mol of acid per liter and having a number of mol of acid per liter one of substantially identical to and greater than the aqueous solution having from 7 to 12 mol of acid per liter.

23. The process according to claim 22, wherein during the removal of the zirconium and hafnium contained in the interstices, the resin is purged of its liquid content.

24. The process according to claim 23, wherein the resin is then rinsed using a strong inorganic acid solution having from 7 to 12 mol of acid per liter and having a number of mol of acid per liter substantially identical to or greater than the aqueous solution having from 7 to 12 mol of acid per liter.

25. The process according to claim 24, further comprising:
    washing the resin using an aqueous solution having an acid concentration which is between 0 and 7 mol of acid per liter and is lower than that used in preceding steps, of between 0 and 7 mol of acid per liter and a fraction enriched with zirconium is recovered.

26. The process according to claim 25, wherein water is used.

27. The process according to claim 25, wherein at least two aqueous solutions having decreasing acid concentrations are used.

28. The process according to claim 27, wherein water is used last.

29. The process according to claim 25, wherein the acid is HCl.

\* \* \* \* \*